United States Patent [19]

Inoue

[11] 4,394,030

[45] Jul. 19, 1983

[54] KING PIN CONNECTING MECHANISM

[75] Inventor: Akira Inoue, Kitakyushu, Japan

[73] Assignee: Hitachi Metals, Ltd., Japan

[21] Appl. No.: 228,180

[22] Filed: Jan. 26, 1981

[51] Int. Cl.³ .............................................. B62D 53/06
[52] U.S. Cl. ...................................... 280/434; 280/440
[58] Field of Search ................ 280/433, 434, 435, 436, 280/438 R, 438 A, 439, 440

[56] References Cited

U.S. PATENT DOCUMENTS

| 2,359,498 | 10/1944 | Walther et al. | 280/434 |
| 2,423,743 | 7/1947 | Walther et al. | 280/440 |
| 2,788,989 | 4/1957 | Davies | 280/434 |
| 3,633,941 | 1/1972 | Pleier | 280/440 |
| 3,830,523 | 8/1974 | Morichetto | 280/434 |

FOREIGN PATENT DOCUMENTS 2543115  3/1977  Fed. Rep. of Germany ...... 280/434

Primary Examiner—Joseph F. Peters, Jr.
Assistant Examiner—Ross Weaver
Attorney, Agent, or Firm—Finnegan, Henderson, Farabow, Garrett & Dunner

[57] ABSTRACT

A connecting mechanism for connecting a king pin fixed to a trailer to a fifth wheel mounted on a tractor. The connecting mechanism has a box structure in which major parts for connecting the king pin are mounted pivotally. The box structure is secured detachably to the lower face of a fifth wheel plate, so that the major parts can easily be replaced or inspected simply by a demounting of the box structure. It is possible to provide an elastic member between the fifth wheel plate and the box structure so as to absorb the impact applied to the connecting mechanism to prevent rapid wear of the parts and to improve the comfort of the driver.

3 Claims, 5 Drawing Figures

KING PIN CONNECTING MECHANISM

BACKGROUND OF THE INVENTION

The present invention relates to a connecting mechanism and, more particularly, to a king pin connecting mechanism suitable for use in connecting a king pin provided on a trailer to a fifth wheel mounted on a tractor.

Such a king pin connecting mechanism for connecting a king pin to a fifth wheel has been known as having two locks swingable to the left and right around lock pins between a locking position for connecting the king pin and a releasing position for releasing the king pin from locking. Also, known is a mechanism in which a C-shaped lock is swung around a lock pin to connect and release the king pin by the action of a wedge.

In these known king pin connecting mechanisms, however, parts of the mechanism such as the lock, pin, pin-receiving bore, and so forth, are worn out rapidly as a result of repeated starts and stops of the tractor, as well as repeated locking and releasing operations, requiring frequent replacement of these parts. Since these parts are mounted on the fifth wheel plate, it takes considerable labour and time for demounting and mounting of these parts.

SUMMARY OF THE INVENTION

Accordingly, an object of the invention is to provide a king pin connecting mechanism which permits easy replacement, as well as inspection and maintenance, of the major parts of the connecting mechanism.

To this end, according to the invention, there is provided a king pin connecting mechanism for connecting a king pin fixed to a trailer to a fifth wheel provided on a tractor, comprising a box structure to which major parts for connecting the king pin, such as a lock, are secured by means of pins, the box structure being secured detachably to the lower side of the fifth wheel plate. Therefore, it is easy to replace the parts and to perform necessary inspection and maintenance, by demounting the box structure or renewing the same.

It is preferred to provide an elastic member between the box structure and the fifth wheel plate, because, by so doing, it is possible to suppress the wear of the parts and to improve the durability of the parts, while improving the comfort of the driver.

DESCRIPTION OF THE PREFERRED EMBODIMENTS

Figure 1:
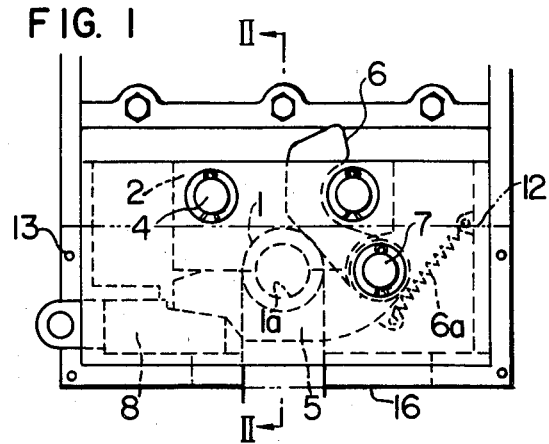
FIG. 1 is a bottom plan view of and king pin connecting mechanism in accordance with the invention in the connecting condition.
Figure 2:
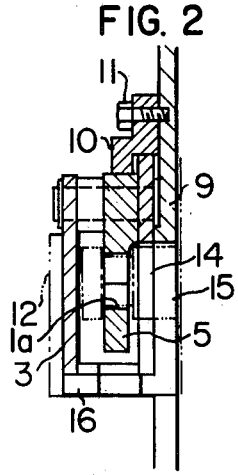
FIG. 2 is a sectional view taken along the line II—II of FIG. 1.
Figure 3:
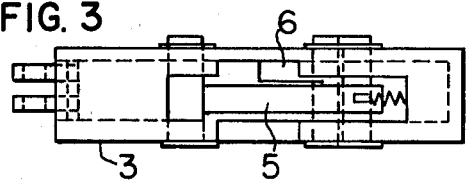
FIG. 3 is a front elevational view of the king pin connecting mechanism.

Hereinafter, the invention will be described in more detail with reference to the accompanying drawings showing preferred embodiments of the invention.

Referring to the drawings, there is shown a connecting mechanism for connecting a king pin fixed to a trailer to a fifth wheel provided on a tractor. The mechanism has a stationary lock 2 for connecting a king pin 1 (lock 2 is attached to a box structure 3 by means of a pin 4), and a movable lock consisting of a main part 5 and a hook 6 unitary with each other. The unitary structure of the movable lock is mounted rotatably in the box structure 3 by means of a pin 7, with the main part 5 retained by a retainer piece 8 movably mounted within box structure 3. The king pin 1 is inserted in a king pin hole 1a provided in the stationary lock 2 and the main body 5, and the main body 5 and hook 6 are rotated counterclockwise by a spring 6a.

Thus, the major parts of the mechanism for connecting the king pin 1 are mounted in the box structure 3, and the box structure 3 is secured to the fifth wheel plate 9 by means of a retainer member 10 and a bolt or bolts 11. A cover 12 is secured to the box structure 3 by means of bolts 13 to prevent the box structure from being dropped. A reference numeral 14 designates a slot formed in the box structure and adapted to receive the king pin 1, while a reference numeral 15 designates a slot formed in the fifth wheel plate.

When the king pin 1 is brought into connection, or when the tractor is braked, the box structure 3 is pushed ahead through the medium of the stationary lock. This force is born by the bolt 11, through the medium of the retainer member 10. On the other hand, when the tractor starts to run, the box structure 3 is pulled rearwardly through the main part 5 of the movable lock. This force is borne by a rib 16 formed on the fifth wheel plate 9 to project therefrom.

Figure 4:
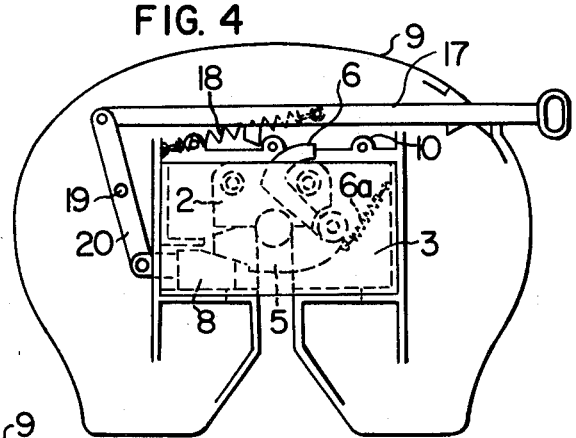
FIGS. 4 and 5 are bottom plan views of alternate king pin connecting mechanisms in accordance with the invention.

FIG. 4 shows the connecting mechanism in the state in which the king pin 1 is connected. As a bar 17 is pulled to the right in this state, the spring 18 is stretched and a link 20 is rotated clockwise around a pin 19 secured to the fifth wheel plate 9. In consequence, the retainer piece 8 is moved to the left away from the main part 5 of the movable lock, to permit the king pin 1 to be released.

Figure 5:
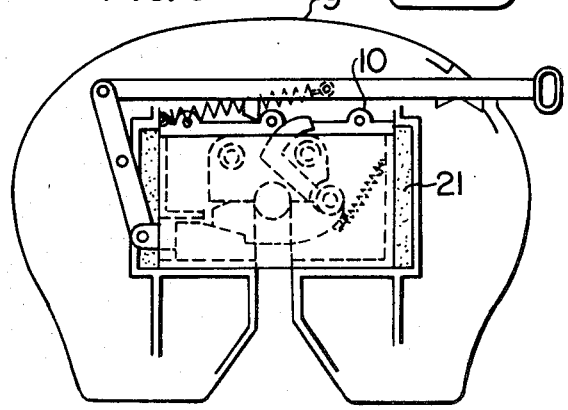

FIG. 5 shows a modification of the connecting mechanism in which an elastic member 21 is interposed between each of left and right side surfaces of the box structure and the fifth wheel plate. The box structure 3, in this case, is held in such a manner as to be able to move to the left and right, although it is fixed against movement in the forward and backward direction as in the embodiment described in connection with FIGS. 1 to 4.

These elastic members 21 effectively buffer the impacting load applied to the stationary lock 2 and the main part 5 of the movable lock, thereby to prevent the wear of parts to increase the durability thereof.

As will be understood from the foregoing description, according to the invention, the major parts for connecting the king pin are received and housed by a box structure, so that replacement of the parts, as well as inspection and maintenance work on the same, is facilitated remarkably.

In addition, the elastic members interposed between the box structure and the fifth wheel plate effectively prevent the wear of the parts and improve the durability of the same, while achieving an improvement in the comfort of the driver.

What is claimed is:

1. A connecting mechanism for connecting a king pin fixed to a trailer to a fifth wheel plate provided on a tractor, comprising: a substantially enclosed box structure having a slot extending longitudinally in one side thereof for receiving said king pin therein, and having an opening in an adjacent side thereof contiguous with said slot for permitting entry of said king pin into said box structure and into said slot, said box structure having pivotally mounted therein at least a portion of the parts for connecting said king pin, said box structure being detachably attached in a secure manner to the lower face of said fifth wheel plate, with said one side of said box structure adjacent thereto.

2. A connecting mechanism for connecting a king pin fixed to a trailer to a fifth wheel plate provided on a tractor as claimed in claim 1, further comprising an elastic member interposed between said box structure and said fifth wheel plate for absorbing impacts applied to the connecting mechanism.

3. Apparatus as claimed in claim 2, wherein at least a portion of said elastic member is interposed between said fifth wheel plate and the sides of said box structure which extend parallel to said slot and transverse to said lower face of said fifth wheel plate.

* * * * *